United States Patent
Schmatz et al.

(10) Patent No.: US 7,165,593 B2
(45) Date of Patent: Jan. 23, 2007

(54) DEVICE FOR OPTIMIZING BEAD SEATING

(75) Inventors: Heinz-Wemner Schmatz, Ingoistadt (DE); Karl Seyberth, Greding (DE)

(73) Assignee: Audi AG (DE)

( * ) Notice: Subject to any disclaimer, the term of this patent is extended or adjusted under 35 U.S.C. 154(b) by 5 days.

(21) Appl. No.: 10/497,142

(22) PCT Filed: Nov. 30, 2002

(86) PCT No.: PCT/EP02/13550

§ 371 (c)(1),
(2), (4) Date: May 28, 2004

(87) PCT Pub. No.: WO03/047891

PCT Pub. Date: Jun. 12, 2003

(65) Prior Publication Data

US 2005/0000662 A1    Jan. 6, 2005

(30) Foreign Application Priority Data

Dec. 5, 2001   (DE) ................................ 101 59 766

(51) Int. Cl.
*B60C 25/00* (2006.01)

(52) U.S. Cl. ........................................ 157/1.1; 157/1.21

(58) Field of Classification Search .................... 157/1, 157/1.1, 1.17, 1.2, 1.21, 1.22

See application file for complete search history.

(56) References Cited

U.S. PATENT DOCUMENTS

| | | | | |
|---|---|---|---|---|
| 4,886,101 A * | 12/1989 | Kinnick et al. | ............. | 157/1.22 |
| 5,222,539 A * | 6/1993 | Ruppert et al. | ............. | 157/1.21 |
| 6,557,610 B1 * | 5/2003 | Koerner et al. | ................ | 157/1 |
| 2002/0124971 A1 * | 9/2002 | Koerner et al. | ................ | 157/1 |
| 2004/0045680 A1 * | 3/2004 | Kasner et al. | ................ | 157/1 |

* cited by examiner

*Primary Examiner*—Debra S Meislin
(74) *Attorney, Agent, or Firm*—Stevens, Davis, Miller & Mosher, LLP

(57) ABSTRACT

The invention relates to a device for optimizing bead seating (1). According to the invention, a displaceable contact wheel is used to create a tread contact surface (26) between a motor vehicle wheel to be optimized (16) and said contact wheel (2). The contact wheel (2) is pivoted by means of a pivoting receiving element (9), enabling the bead seating to be optimized. In order to ensure a predefinedly high number of vehicle wheels (16) to be optimized, the inventive device for optimizing bead seating (1) is embodied in such a way that the optimization process can be carried out in a fully automated manner.

4 Claims, 3 Drawing Sheets

DEVICE FOR OPTIMIZING BEAD SEATING

This is a 371 of PCT/EP02/13550 filed Nov. 30, 2002.

The invention relates to a device for optimizing bead seating as specified in the description and the appended claims.

BACKGROUND OF THE INVENTION

It is known that isolated volumes of air may be trapped between the edges of a tire and the rim bed when tires are mounted on vehicle rims. Such vehicle wheels with these trapped air volumes are subsequently balanced. This may result in undesirable imbalance conditions after such trapped air volumes escape, in particular during subsequent driving around curves when loads are applied to the tires. This is undesirable especially after delivery of new vehicles and represents a deficiency of quality, even if a relatively rare one, and requires rebalancing in a workshop. Devices for elimination of such trapped air volumes have already been disclosed.

A generic device for optimizing bead seating (disclosed in DE 40 06 182 A1) consists of two lower and two upper contact pressure wheels which effect rotation of a wheel of a vehicle. At the same time, the vehicle wheel is held in its position by the four contact pressure wheels. The axis of rotation of the vehicle wheel is horizontal during the process. Side clamping disks which cause deformation of the tire sides are pressed against both sides of the vehicle tire for optimizing bead seating. Bead seating is accordingly optimized in that each of the edges of the tire comes in contact with the rim bed without trapped air volumes as it rotates.

The complete structure of the generic device comprises a lower part, an upper part, and a stay mounted between the upper and the lower part as a connecting element. The upper part may be displaced vertically in relation to the lower part. Two pressure application wheels are mounted on the top of the lower part and also on the bottom of the upper part. The diameter of the contact pressure wheels is very small in comparison to the diameter of the vehicle wheel. Pivoting movement of the contact pressure wheels is not provided. In addition, the vehicle wheel cannot be pivoted out of its axis of rotation. The upper part of the device may be displaced horizontally backward from an operating position to a non-operating position in order to create sufficient clearance for fitting the device with components or for removing the seating-optimized tire.

In order for a vehicle wheel to be optimized it must be positioned in the device on the two contact pressure wheels of the lower part with horizontal axis of rotation. The next operating step is moving the upper part from its non-operating position to its operating position. In order for the vehicle wheel to be immobilized in its optimization position, the upper part is displaced vertically in the direction of the lower part until the contact pressure wheels on the bottom of the upper part come into contact with the vehicle wheel introduced into the device and accordingly hold this wheel stationary. The contact pressure wheels of the lower part are operated and the vehicle wheel is set in rotary movement by means of a drive device in the lower part of the device. The two side clamping disks are now pressed by means of a hydraulic control unit against the sides of the tire of the vehicle wheel and the sides of the tire are correspondingly deformed. Normal driving around curves is thereby simulated and optimized bead seating thus ensured. In order for it to be possible to remove the vehicle wheel from the device, the upper part must be moved first vertically upward and then horizontally rearward into its non-operating position.

Consequently, the entire seating optimization process for a vehicle wheel, including fitting of the device with components and removal, takes so long that the generic device does not appear to be suitable at least for use by a vehicle manufacturer involving large numbers of individual vehicle wheels. As a result of the upright positioning of the vehicle wheel, one worker is always required who holds the vehicle wheel in position after the device has been fitted with components, since immobilization of the vehicle wheel in position is not ensured until after the upper part of the device has reached the operating position. Automation of the optimization process is not provided.

In another disclosed testing device (DE 37 23 767 C2) a vehicle wheel to be tested is pivotably mounted on an axis. This axis may be displaced vertically, so that the running surface of the vehicle wheel may be brought into contact with the running surface of the contact pressure wheel. The contact pressure wheel may be set in rotary movement by means of a drive mechanism. The axis of the vehicle wheel and the axis of the contact pressure wheel are mounted in parallel, without the possibility of adjustment. The orientation of the axes is horizontal. A costly measuring mechanism in the axis of the vehicle wheel permits measurement of the radial and axial forces applied to the vehicle wheel. The design and configuration of the device do not meet the requirements of the tire test stand for individual test tires. This device is not designed for bead seating optimization, especially on a large number of vehicle wheels.

SUMMARY OF THE INVENTION

The object of the invention is further development of a generic device for optimizing bead seating which permits such bead seating optimization in a short time and with a large number of vehicle wheels such as are required in mass production by automotive manufacturers.

This object is attained by the characteristics specified in the claims hereinafter appended.

The claims specify that a device for optimizing bead seating has a moving mechanism by which a contact pressure wheel may be moved against a vehicle wheel held stationary. The contact pressure wheel axis and the vehicle wheel axis are positioned in parallel planes. As a result, contact may be established between the contact pressure wheel running surface and the vehicle wheel running surface on a running contact surface. The contact pressure wheel and accordingly the vehicle wheel are set in rotary movement by means of a contact pressure wheel drive. The vehicle wheel may be pivoted around a pivot axis by means of a controllable rotating device, the pivot axis being oriented radially in relation to the contact pressure wheel and toward the running contact surface.

The vehicle wheel may be advantageously optimized in this way in relation to its bead seating. For this purpose contact with the roadway is simulated on the running contact surface and driving around curves is simulated by the pivoting movement of the rotating device. As a result of this movement stress is applied to the bead seating on the rim so that any trapped air volumes arising in the area of the rim base during mounting of the tire circumferentially on the rim are eliminated. A long period of trouble-free running of the vehicle wheel is thus guaranteed after a subsequent balancing process.

A development of the automated device for optimizing bead seating may be applied to large numbers of vehicle tires.

In one preferred development of the device the contact pressure wheel with contact pressure wheel drive is mounted in the rotating device configured as a rotating seating component. This rotating seating component is pivotable by means of rollers in a pivot sliding block on a segment-of-circle path by means of a controllable actuator. The pivot sliding block is mounted in a sliding block guide component and the rotating seating component is guided by means of rollers on the circular segment path in the pivot sliding block in the sliding block guide component. The center of the segment-of-circle path is positioned on the pivot axis. A rotating configuration such as this may be produced with relatively high cost effectiveness and may easily be integrated into the device in the space required. In addition, the forces which arise may be suitably controlled by the device.

In one alternative embodiment, the contact pressure wheel with the contact pressure wheel drive is mounted in the rotating device configured as a pivot bearing component. The pivot bearing component may be pivoted about a pivot bearing axis by means of a controllable actuator. The pivot bearing axis associated with the pivot bearing component is mounted perpendicularly to the contact pressure wheel axis. A relatively cost-effective pivot configuration which may be easily integrated into the device as a whole is also provided by this alternative embodiment. Suitable control of the device by means of the actuator is possible in this configuration as well.

The actuator for the pivoting movement of the pivot bearing component is configured as a controllable pneumatic or hydraulic cylinder piston mechanism. A controllable electric motor mechanism is proposed as an alternative. Such actuators are available on the market in a large number of suitable configurations.

In a further embodiment, the rotating device is configured as a displaceable moving mechanism. The moving mechanism is positioned so as to be perpendicular to the parallel planes of the contact pressure wheel axis and the vehicle wheel axis. Displacements which may be carried out rapidly as short relocation movements are achieved as a result.

A preferred embodiment of the moving mechanism is configured as a slide. The slide may be moved relative to a base frame on lateral rail guides. A stable displacement device is proposed which is well suited for the loads which occur, is easy running, and is simple to control.

The sliding block guide component is mounted in the moving mechanism by means of force measurement mechanisms. In this way the radial and axial forces arising on the contact pressure wheel and the reaction forces arising on the tire may be measured and used as control-relevant parameters for control of optimizing bead seating. In particular, assigned limiting values for permissible tire loading may thereby be automatically taken into account.

According to a further embodiment, the maximum deflection of the moving mechanism and/or the rotating device may be limited by mechanical stops. In addition or as an alternative to the force-dependent control indicated above, erroneous setting of the device, which in the worst case results in destruction of the vehicle wheel to be optimized, is eliminated.

According to yet a further embodiment, the diameter of the contact pressure wheel corresponds at least to the diameter of the vehicle wheel. The diameter of the contact pressure wheel is to be somewhat larger than that of the vehicle wheel. A running contact surface which corresponds in approximation to the tire contact surface during vehicle operation and is adequate for effective optimization of the bead seating is thereby obtained. Generally, however, any diameter of the contact pressure wheel is possible.

A further embodiment specifies that two, preferably three, seats are available for one vehicle wheel in order to make it possible to automate the device. A conveying mechanism connects the three seats. Each seat is designed so that the vehicle wheel is seated in a spindle bearing. Automatic centering of the vehicle wheel in the seat is thereby ensured. The axis of rotation of the vehicle wheel is vertically oriented. The horizontal positioning of the vehicle wheels in the seats makes possible simple, and especially also robot-supported, complementation of the device.

Another preferred embodiment is proposed wherein three different operating processes are provided for the three seats for a vehicle wheel. At station I the seat is complemented with a non-optimized vehicle wheel. The non-optimized vehicle wheel is conveyed to station II by the conveying mechanism. Optimized bead seating of the vehicle wheel takes place at this station. The vehicle wheel is then conveyed further to station III, at which the vehicle wheel may be removed. One-time balancing of the vehicle wheel for optimal running properties after optimization of bead seating is sufficient. This balancing eliminates any unbalance arising during driving which may result from escaping trapped air volumes between tire and rim base. Station I and station III may be loaded and unloaded free of problems with a robot-controlled additional layout, so that optimizing bead seating at high speed is possible.

The vehicle wheel at station II is kept stationary and rotatable in order to achieve a flawless, reproducible optimization process. A still further embodiment specifies that the vehicle wheel is immobilized at station II during the optimization process by simple means, by a controllable immobilization mechanism.

In order to increase the effectiveness of the device stations I to III are positioned on both sides of the contact pressure wheel. The contact pressure wheel may be displaced alternately between the stations II on both sides by the moving mechanism. Thus, during the optimization process on side A to side B an already optimized vehicle wheel is moved further from station II to station III and at the same time a vehicle wheel from station I to be optimized is mounted at station II. After the optimization process has been completed on side A, the moving mechanism moves to side B and, when there, begins the process of optimization of the vehicle wheel at station II. At the same time, mounting of a tire at the station changes to side A so that the next vehicle wheel to be optimized is positioned at station II. Doubling of the number of vehicle wheels to be optimized by simple and cost-effective means is possible with this configuration on both sides.

An even further embodiment specifies that it is possible to effect in one process step moving of the moving mechanism to establish contact between the contact pressure wheel running surface and the vehicle wheel running surface on the running contact surface. The displacement is controlled by a predetermined metrologically recorded contact pressure. The displacement may be executed with at least one further process step. In the process the rotating device is rotated around a rotating axis by means of the actuator. A maximum angle of rotation is predefined and may be recorded metrologically.

Consequently, a fully automatic device for optimizing bead seating is claimed, one which can optimize the number of units required on vehicle wheels to be optimized.

BRIEF DESCRIPTION OF THE DRAWINGS

An exemplary embodiment of the invention is described in greater detail in what follows with reference to a drawing, in which.

DETAILED DESCRIPTION OF THE INVENTION

Figure 1:
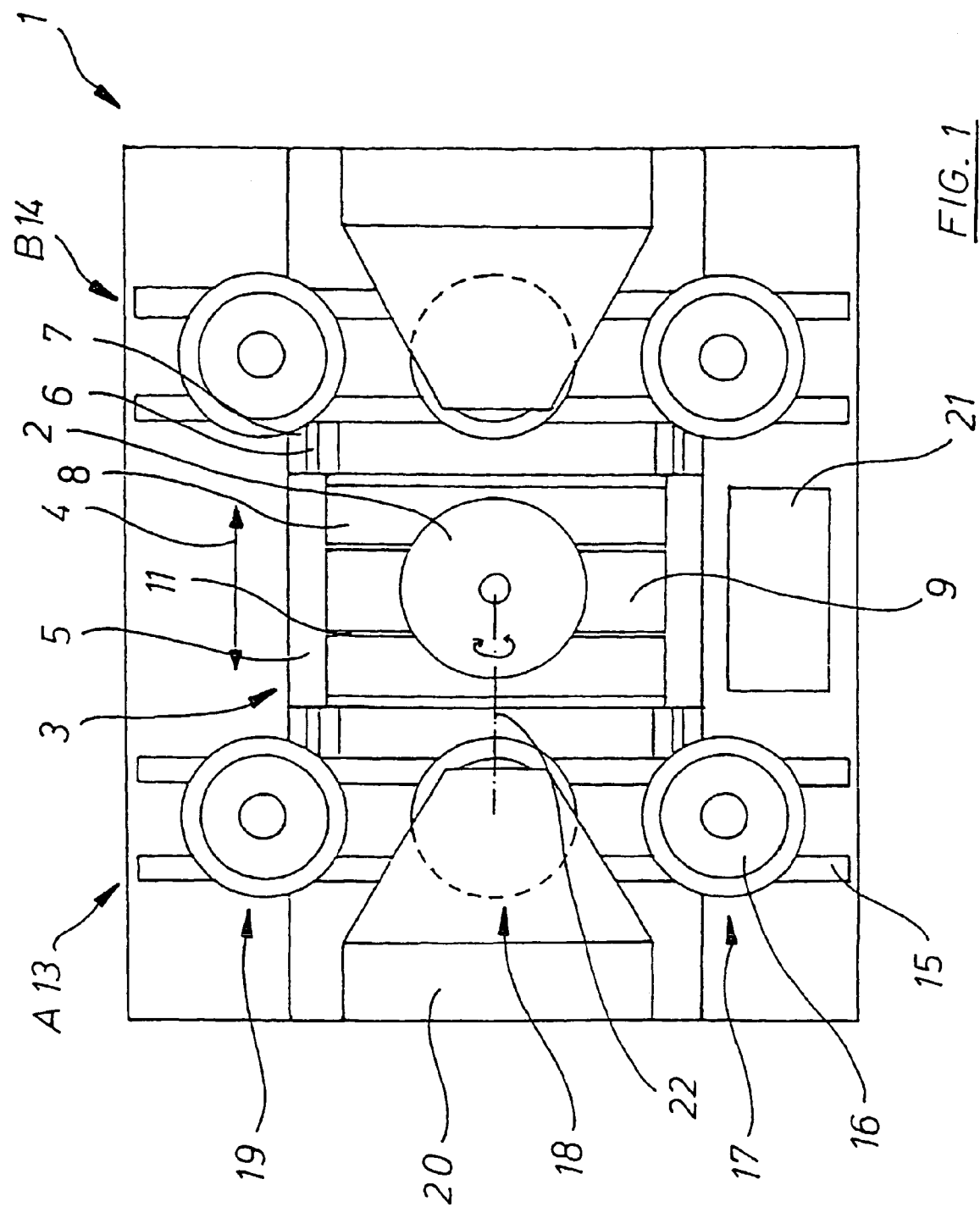
FIG. 1 presents a schematic top view of a device optimizing bead seating, FIG. 2 a schematic side view of a part of the device shown in FIG. 1 with a contact pressure wheel in a rotating device in a moving mechanism, and FIG. 3 a schematic side view of a pivot bearing component.

FIG. 1 presents a top view of a device 1 for tire optimization. This device consists of a contact pressure wheel 2 mounted on a moving mechanism 3. The moving mechanism is indicated by a two-way arrow 4. The moving mechanism 3 consists of a slide 5 which may be moved on a slide mounting 6 relative to a base stand 7 in the displacement direction 4. A sliding block guide component 8 is mounted on the slide 5. As is shown in detail in FIG. 2, a rotating seating component 9 is mounted rotatably on this sliding block guide component 8 by means of rollers 10 in a pivot sliding block 11 designed as a circle segment-of-circle path. Mounted below the contact pressure wheel 2 and not shown in FIG. 1, is a contact pressure wheel drive 12 by which the contact pressure wheel 2 may be set in rotary movement. Shown on the side of the contact pressure wheel, on side A 13, is a conveying mechanism 15 with three seats each for a vehicle wheel 16, with a conveying mechanism perpendicular to the displacement direction 4. The axis of rotation of each seat is vertically oriented and is positioned in a plane parallel to the axis of rotation of the contact pressure wheel 2. A different operating process is assigned to each seat, so that a station I 17, a station II 18, and a station III 19 are provided in the sequence of progress of the operations. A controllable locating mechanism 20 is mounted at station II 18. The structure of side B 14 is a mirror image of side A 13. The operation of the device for optimizing bead seating is under fully automatic control by means of a central control mechanism 21.

Figure 2:
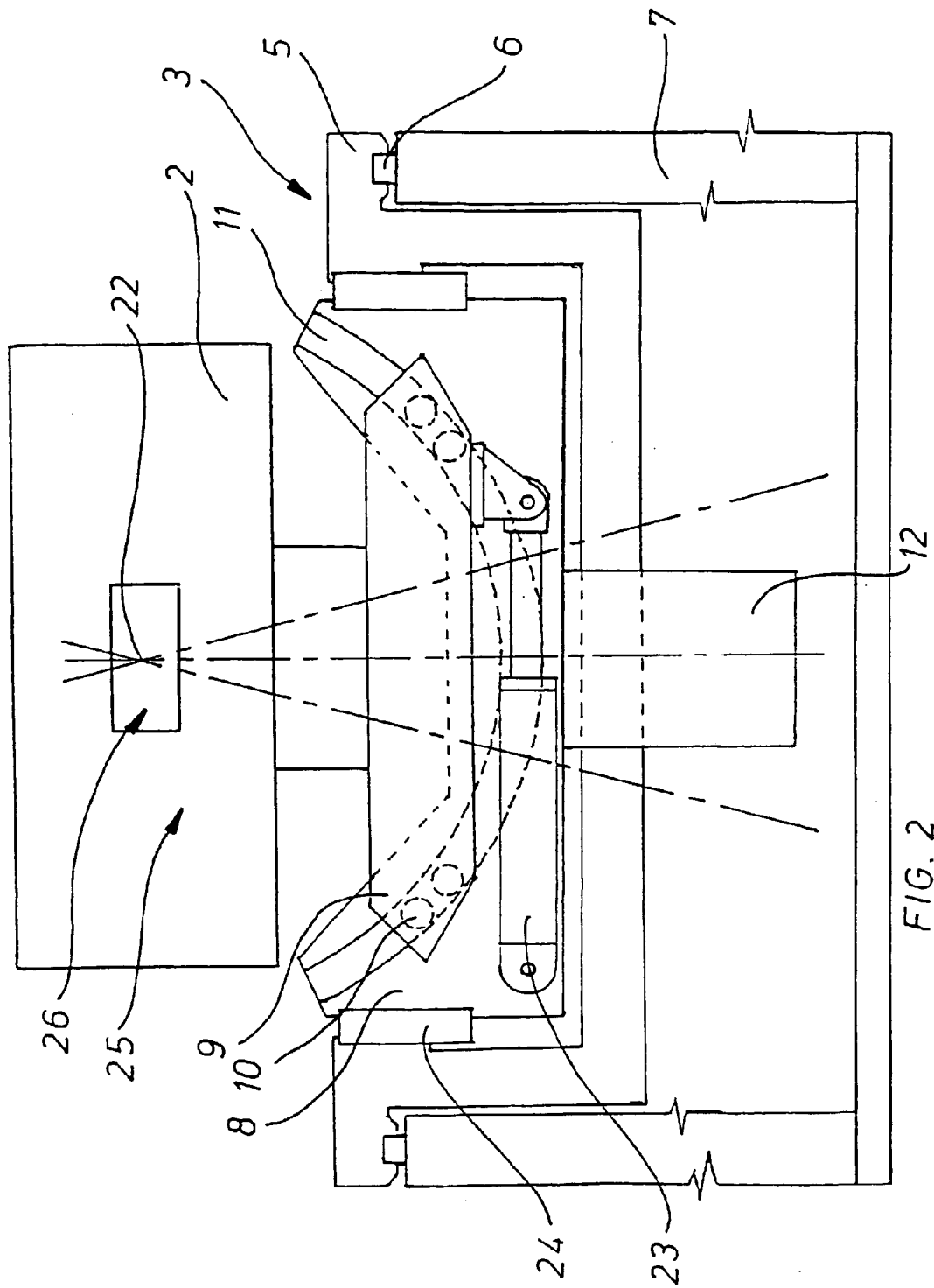

FIG. 2 presents a schematic side view of the contact pressure wheel 2 with its associated contact pressure wheel drive 12. These two structural components, together with the rotating seating component 9, form a structural unit which is pivotable by means of rollers in the pivot sliding block 11 about a pivot axis 22, which is perpendicular to the plane of the drawing. The pivot sliding block 11 is mounted on the sliding block guide component 8 and pivoting may be effected by means of an actuator 23 which as a controllable cylinder-piston unit effects connection between the slide block guide component 8 and the rotating seating component 9. The sliding block guide component 8 is seated on the slide 5 by way of force measurement mechanisms 24 the sensor signals of which may be delivered to the control device. The slide 5 may be displaced relative to the base stand 7 by means of the slide mounting 6. The displacement direction 4 is parallel to the pivot axis 22.

Figure 3:
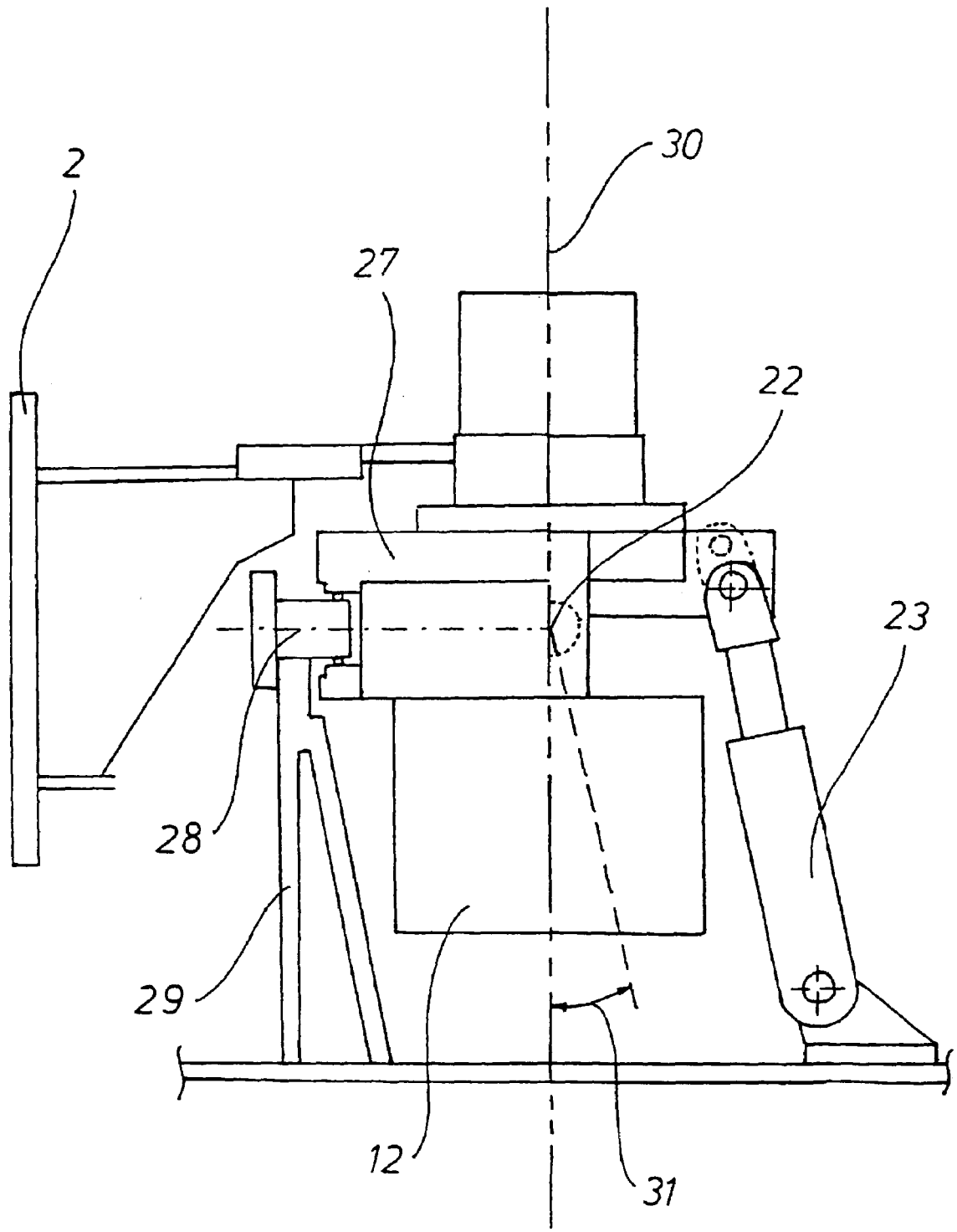

FIG. 3 presents a schematic side view of a pivot bearing component 27. The left half of the diagram shows a true view, while the right half is rotated 90° in the plane of the drawing on the center line drawn in (corresponding to the contact pressure wheel axis 30). The pivot bearing component 27 is pivotably mounted on a contact pressure wheel axis 28, which is introduced into a pivot bearing axis seat 29. There is attached to the pivot bearing component 27 an actuator 23 by means of which the pivot bearing component may be pivoted. An extended position of the actuator 23, which is then associated with pivoting of the pivot bearing component 27 through the pivot angle 31, is indicated by a broken line in the right half of the diagram. Support of the actuator 23 is represented by the pivot bearing axis seat 29. The contact pressure wheel 2 is rigidly connected to the pivot bearing component 27 and may be rotated with it about the contact pressure wheel axis 30. The contact pressure wheel drive 12 is positioned below the contact pressure wheel 2. The pivot bearing wheel axis seat 27 is mounted on a moving mechanism with force measurement mechanisms, not shown in FIG. 3.

The configuration illustrated in FIGS. 1, 2, and 3 performs the following function.

Contact between contact pressure wheel running surface 25 and a vehicle wheel running surface on the running contact surface 26 may be established through controlled displacement of the slide 5, and accordingly of the contact pressure wheel 2, to a vehicle wheel 16 at station II 18. The contact pressure wheel 2, and with it the vehicle wheel 16, is set in rotation by means of the contact pressure wheel drive 12. As a result of pivoting of the rotating seating component 9 and accordingly of the pivot bearing component 27, during the time of contact of the two running surfaces the planes of the two wheels are tilted relative to each other and a curve travel load on the running contact surface 26 is generated in the tire, as a result of which the bead seating on the rim is optimized. The displacement and pivoting are controlled by the central control mechanism 21, it being possible to allow for particular, assignable, maximum tire loads through evaluation of the test signals of the power measurement mechanisms 24.

Conveying mechanisms 15 each with three seats each for a vehicle wheel 16 are mounted on both sides A and B 13, 14 of the contact pressure wheel 2 for automation of the device for optimizing bead seating 1. Mounting of a vehicle wheel 16 to be optimized in the device takes place at station I 17. The vehicle wheel 16 is held stationary and rotatable for the optimization process at station II 18 by means of a locating mechanism 20. The optimized vehicle wheel 16 is removed at station III 19. Movement of a large number of vehicle wheels 16 to be optimized is made possible by mounting of the stations I to III 17, 18, 19 on both sides. The vehicle wheel 16 is conveyed further at the stations during the optimization process on side A 13 by means of the conveying mechanism 15 on side B. After the optimization process has been completed on side A 13, the slide 5 with contact pressure wheel 2 is moved to side B 14 and optimization of the vehicle wheel 16 is carried out there at station II 18. At the same time, the vehicle wheel 16 just optimized is conveyed further on side A 13 by conveying mechanism 15 to station III 19 for removal and a vehicle wheel 16 coming from station I 17 to be optimized is brought to station II 18. All the processes required for the optimization process are controlled by means of the central control mechanism 21.

Control of displacement of the slide 5, pivoting of the rotating seating component 9 and of the pivot bearing component 27, and conveying of the vehicle wheels 16 are prerequisites for a fully automatic optimization process. Mounting of the stations I 17 to III 19 on both sides makes possible optimization of a large number of vehicle wheels 16 in conjunction with mass vehicle production. Robot-supported mounting at station I 17 and removal from station III 19 ensures processing without a worker.

The invention claimed is:

1. An apparatus for optimizing the bead seating of a tire having a running surface, mounted on a rim of a vehicle wheel, said apparatus comprising:
    means for supporting said wheel at a station for rotation thereof about an axis thereof;
    a pressure wheel mounted on said supporting means having an axis of rotation disposed parallel to said first mentioned axis of rotation, and a contact surface engageable in pressure bearing relationship with said running surface of said tire of said wheel; and
    means for pivoting said pressure wheel about a third axis disposed substantially perpendicular to said second mentioned axis.

2. The apparatus of claim 1, wherein said pivoting means is a controllable pneumatic or hydraulic cylinder piston.

3. The apparatus of claim 1, wherein a diameter of said pressure wheel is at least as great as a diameter of said vehicle wheel.

4. The apparatus of claim 1, further comprising:
    a second means for supporting a second wheel at a second station for rotation thereof about an axis thereof;
    and wherein said pressure wheel is disposed between said first mentioned and second stations, and pivotal about the axis thereof and alternatively engageable with the contact surfaces of the tires of said wheels disposed at said first mentioned and second stations, in pressure bearing relationship therewith.

* * * * *